United States Patent
Hsu

(10) Patent No.: US 9,860,999 B1
(45) Date of Patent: Jan. 2, 2018

(54) BENDABLE DISPLAY APPARATUS AND SUPPORTING DEVICE

(71) Applicant: FIRST DOME CORPORATION, New Taipei (TW)

(72) Inventor: An-Szu Hsu, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 0 days.

(21) Appl. No.: 15/378,428

(22) Filed: Dec. 14, 2016

(51) Int. Cl.
| | | |
|---|---|---|
| *H05K 7/02* | (2006.01) | |
| *H05K 7/04* | (2006.01) | |
| *H05K 5/00* | (2006.01) | |
| *E05D 3/06* | (2006.01) | |
| *E05D 7/00* | (2006.01) | |
| *E05D 5/10* | (2006.01) | |
| *E05D 11/10* | (2006.01) | |
| *H05K 5/02* | (2006.01) | |

(52) U.S. Cl.
CPC ............. *H05K 5/0017* (2013.01); *E05D 3/06* (2013.01); *E05D 5/10* (2013.01); *E05D 7/00* (2013.01); *E05D 11/1028* (2013.01); *H05K 5/0226* (2013.01)

(58) Field of Classification Search
CPC ...... H05K 5/0017; H05K 5/0226; E05D 3/06; E05D 5/10; E05D 7/00; E05D 11/1028
USPC ........................................ 361/755, 809, 810
See application file for complete search history.

(56) References Cited

U.S. PATENT DOCUMENTS

| | | | | |
|---|---|---|---|---|
| 8,813,312 | B2* | 8/2014 | Song .................... | G06F 1/1601 16/225 |
| 9,013,864 | B2* | 4/2015 | Griffin ................ | H04M 1/0216 16/382 |
| 9,047,055 | B2* | 6/2015 | Song ......................... | E05D 3/14 |
| 2014/0174226 | A1* | 6/2014 | Hsu .......................... | E05D 3/122 74/98 |
| 2016/0090763 | A1* | 3/2016 | Hsu .......................... | E05D 3/06 16/354 |

* cited by examiner

*Primary Examiner* — Hung S Bui
(74) *Attorney, Agent, or Firm* — Li & Cai Intellectual Property (USA) Office

(57) ABSTRACT

A supporting device includes a hinge module and two buffering modules respectively installed on two opposite sides of the hinge module. Each buffering module includes an external linking member fixed on the hinge module, an internal linking member movably disposed on the external linking member, a driving member installed on the hinge module and movably disposed on the external linking member, and a transmitting member installed on the external linking member and driven by the driving member to move the internal linking member. The hinge module is bendable between an unfolded position and an inwardly folded position. When the hinge module is bent from the unfolded position toward the inwardly folded position, the driving member of each buffering module moves the corresponding internal linking member away from the pivots by using the transmitting member.

20 Claims, 9 Drawing Sheets

BENDABLE DISPLAY APPARATUS AND SUPPORTING DEVICE

BACKGROUND OF THE INVENTION

1. Field of the Invention

The instant invention relates to a display apparatus; in particular, to a bendable display apparatus and a supporting device.

2. Description of Related Art

When the conventional supporting device is inwardly bent, the total length of the hinge module of the conventional supporting device is not changed, so a plate mounted on an inner surface of the conventional supporting device is deformed because the hinge module compresses the plate. That is to say, when a soft display mounted on the inner surface of the conventional supporting device is inwardly bent, the soft display is easily broken because the hinge module of the conventional supporting device compresses the soft display.

SUMMARY OF THE INVENTION

The instant disclosure provides a bendable display apparatus and a supporting device for effectively solving the problem generated from conventional supporting devices.

The instant disclosure provides a bendable display apparatus, comprising: two supporting devices each including: a hinge module including: a plurality of pivots parallel to each other and arranged in a row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including: an external linking member fixed on the corresponding positioning portion; an internal linking member movably disposed on the external linking member; a driving member having a first end portion and an opposite second end portion, wherein the first end portion is sleeved at one of the pivots, and the second end portion is movable with respect to the external linking member; and a transmitting member movably disposed on the external linking member, wherein the transmitting member is configured to be driven by the second end portion to move the internal linking member; wherein in each of the two supporting devices, the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction; wherein in each of the two supporting devices, when the hinge module is bent from the unfolded position toward the inwardly folded position, the second end portion of the driving member of each of the buffering modules moves the corresponding internal linking member away from the pivots by using the transmitting member; a carrying plate fixed on the internal linking members of the two supporting devices; and a soft display mounted on the carrying plate.

The instant disclosure also provides a supporting device, comprising: a hinge module including: a plurality of pivots parallel to each other and arranged in a row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including: an external linking member fixed on the corresponding positioning portion; an internal linking member movably disposed on the external linking member; a driving member having a first end portion and an opposite second end portion, wherein the first end portion is sleeved at one of the pivots, and the second end portion is movable with respect to the external linking member; and a transmitting member movably disposed on the external linking member, wherein the transmitting member is configured to be driven by the second end portion to move the internal linking member; wherein the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction; wherein when the hinge module is bent from the unfolded position toward the inwardly folded position, the second end portion of the driving member of each of the buffering modules moves the corresponding internal linking member away from the pivots by using the transmitting member.

In summary, when the hinge module is bent between the unfolded position and the inwardly folded position, the hinge module does not compress an object mounted on the supporting device (e.g., the soft display or the carrying plate) by moving the internal linking members with respect to the external linking members. Thus, when the supporting device supports the soft display, the soft display can be inwardly bent without suffering damage.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Figure 1A:
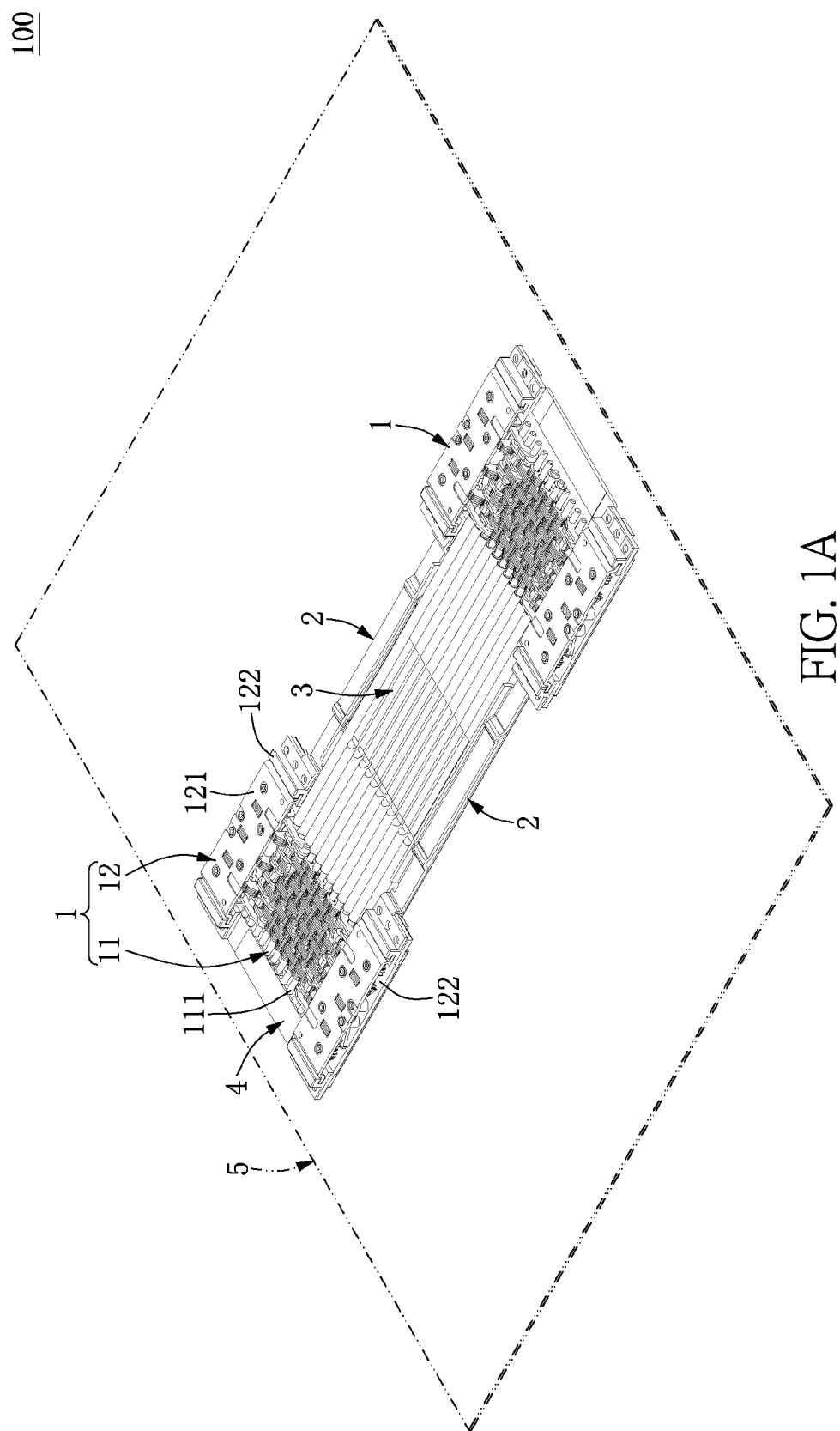
FIG. 1A is a perspective view showing a bendable display apparatus according to the instant disclosure.

Please refer to FIGS. 1A through 7A, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Please refer to FIGS. 1A through 4, which show a bendable display apparatus 100 including two supporting devices 1, two connecting members 2, a plurality of connecting tubes 3, a carrying plate 4, and a soft display 5. The connecting members 2 and the connecting tubes 3 are configured to connect the two supporting devices 1. The carrying plate 4 is arranged on one side (i.e., the lower side shown in FIG. 1A) of the supporting devices 1, the connecting members 2, and the connecting tubes 3. The soft display 5 is disposed on the carrying plate 4. A portion of the soft display 5 corresponding in position to the supporting devices 1 and the connecting tubes 3 can be inwardly bent at 180 degrees (as shown in FIG. 2A) without suffering damage, but the instant disclosure is not limited thereto.

It should be noted that the movement of the bendable display apparatus 100 is a relative motion, so the figures are fixed part of the components for clearly showing the instant embodiment. Moreover, the supporting device 1 in the instant embodiment is applied to the bendable display apparatus 100, but the supporting device 1 can be applied to other apparatus.

The following description discloses the construction of each of the components of the bendable display apparatus 100, and then discloses the related features of the components of the bendable display apparatus 100. The two supporting devices 1 in the instant embodiment are substantially the identical or symmetrical constructions, so the following description only illustrates one of the two supporting devices 1.

Figure 5:
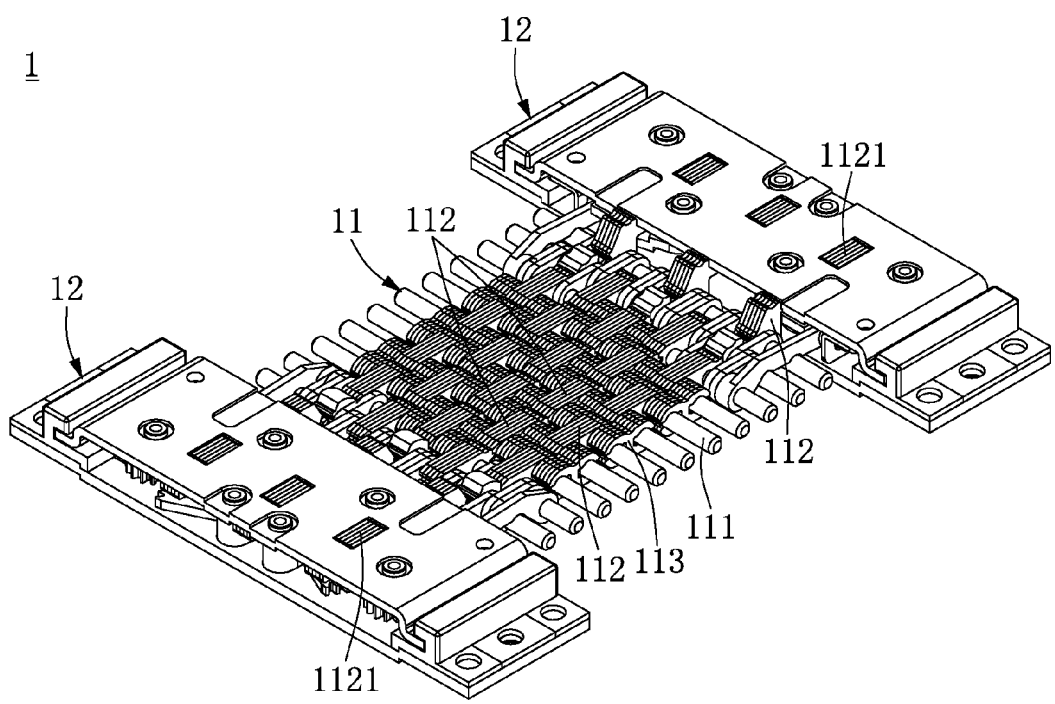
FIG. 5 is a perspective view showing a supporting device according to the instant disclosure.

As shown in FIG. 5, the supporting device 1 includes a hinge module 11 and two buffering modules 12 respectively installed on two opposite sides of the hinge module 11. The hinge module 11 in the instant embodiment has a maximum thickness of 2 mm. The hinge module 11 includes a plurality of pivots 111 parallel to each other and arranged in a row, a plurality of torsion units 112 sleeved at the pivots 111, and a plurality of connecting units 113. The pivots 111 in the instant embodiment are twelve rods, but the instant disclosure is not limited thereto. Each connecting unit 113 can be one sheet or a plurality of stacked sheets, and each of the connecting units 113 is sleeved at two adjacent pivots 111 respectively inserted into two different torsion units 112.

The torsion unit 112 can be at least one of a gear, a plurality of stacked gear-plates, and a plurality of stacked washers. The torsion unit 112 can be sleeved at one of the pivots 111 or two of the pivots 111. In the instant embodiment, the torsion units 112 are arranged in a plurality of rows, and any two adjacent torsion units 112 arranged in the same row are engaged with each other. Moreover, at least one of the rows has two elongated positioning potions 1121 arranged on two of the torsion units 112 thereof. In other words, two positioning portions 1121 of each row of the torsion units 112 are arranged away from each other.

In the instant embodiment, the torsion units 112 each having the positioning potion 1121 and arranged in the same row are respectively sleeved at two of the pivots 111 respectively arranged at two ends of the row of the pivots 111, and the two positioning portions 1121 are arranged at two opposite sides of the row of the pivots 111. Specifically, the torsion units 112 of the instant embodiment have six positioning portions 1121 for respectively connecting the two buffering modules 12, but the instant disclosure is not limited thereto. Moreover, in one of any two adjacent rows of the torsion units 112, the torsion unit 112 provided without any positioning portion 1121 is sleeved at two adjacent pivots 111, in which the two adjacent pivots 111 are respectively inserted into two engaged torsion units 112 of the other row.

Figure 1B:
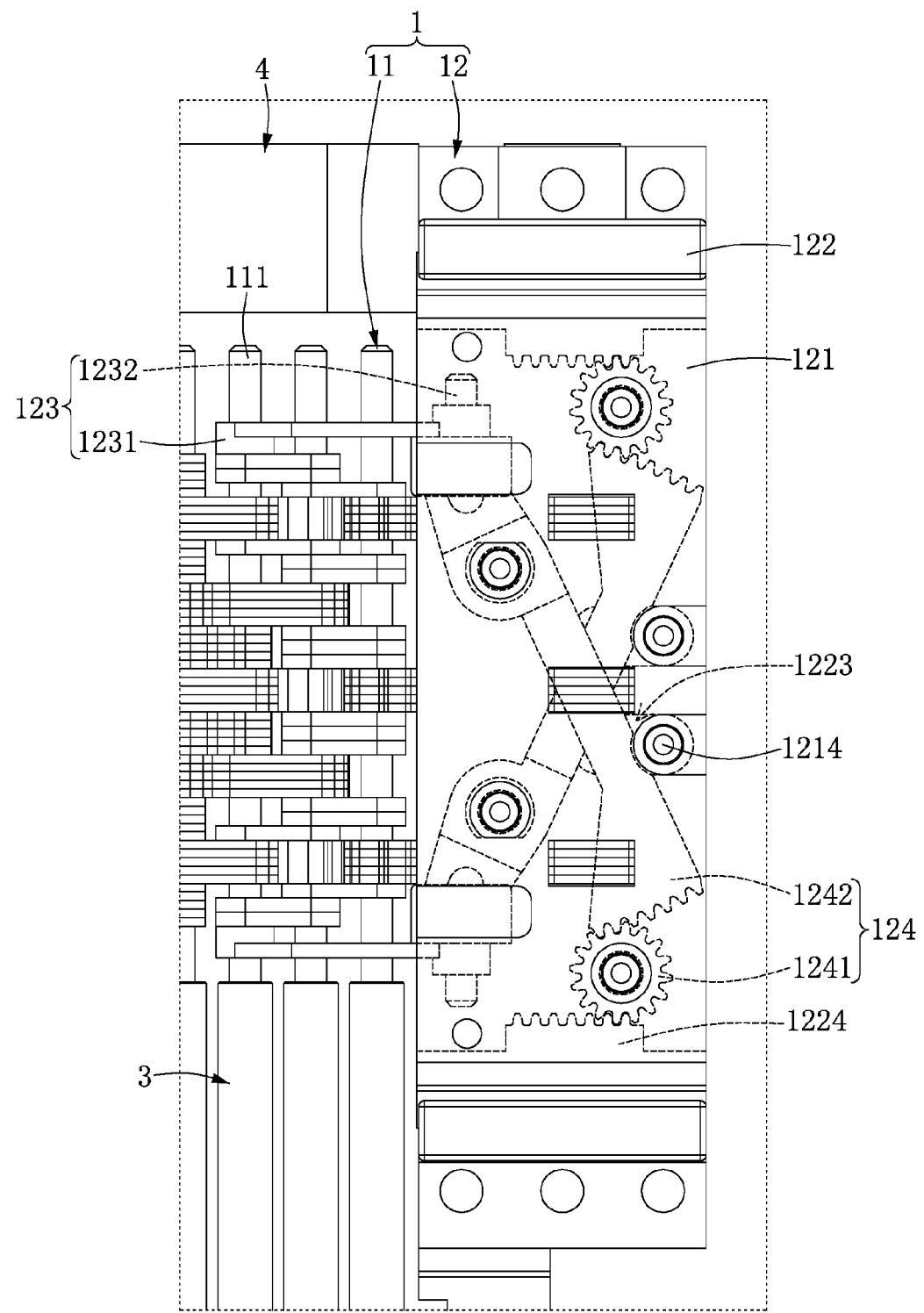
FIG. 1B is an enlarged view of FIG. 1A.
Figure 2A:
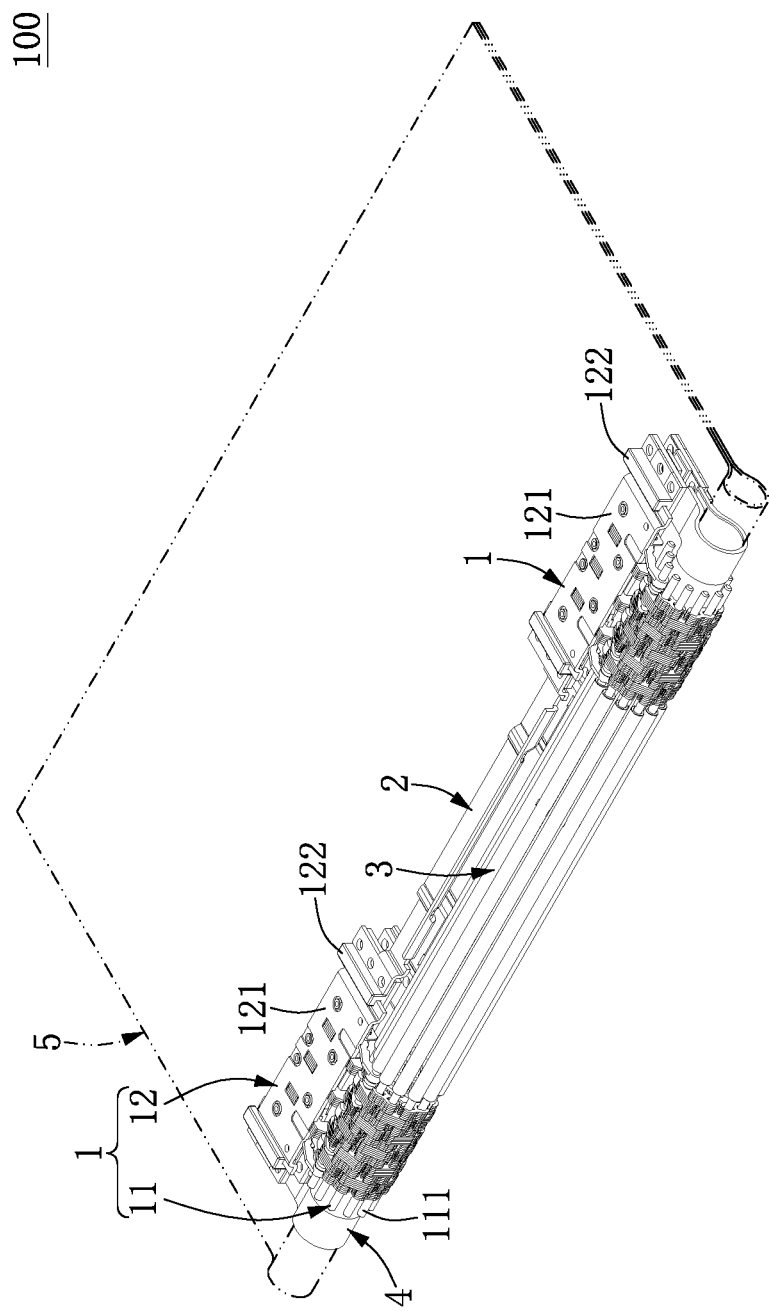
FIG. 2A is a perspective view showing the bendable display apparatus as inwardly being bent at 180 degrees.
Figure 2B:
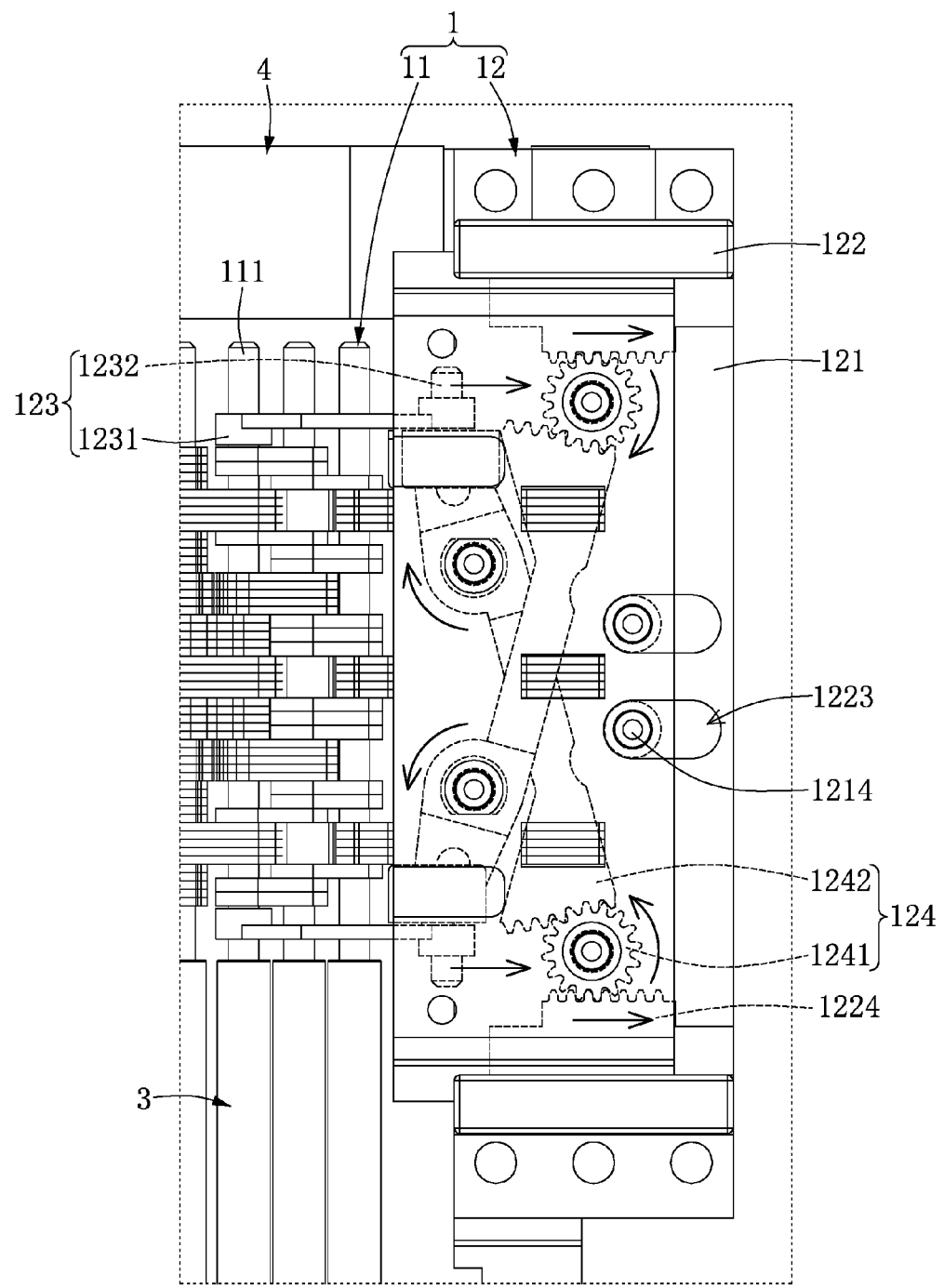
FIG. 2B is an enlarged view of FIG. 2A.

Thus, the hinge module 11 is bendable between an unfolded position (as shown in FIGS. 1A and 1B) and an inwardly folded position (as shown in FIGS. 2A and 2B) along at least one of the pivots 111, and the torsion units 112 are configured to stop the hinge module 11 at a desired position between the unfolded position and the inwardly folded position. When the hinge module 11 is at the unfolded position, the supporting device 1 is a flat construction. When the hinge module 11 is at the inwardly folded position, the supporting device 1 is a curved construction and most of an internal linking member 122 (which is disclosed in the following description) of each buffering module 12 are approximately arranged at the inner side of the curved construction. Specifically, as shown in FIGS. 2A and 2B, the inwardly folded position in the instant embodiment is defined by inwardly bending the hinge module 11 from the unfolded position at 180 degrees, but the instant disclosure is not limited thereto.

As shown in FIG. 5, the two buffering modules 12 are respectively arranged at two opposite sides of the pivots 111, and the two buffering modules 12 are respectively fixed on the positioning portions 1121 of the torsion units 112. The two buffering modules 12 in the instant embodiment are substantially the identical or symmetrical constructions, so the following description only illustrates one of the two buffering modules 12.

Figure 6:
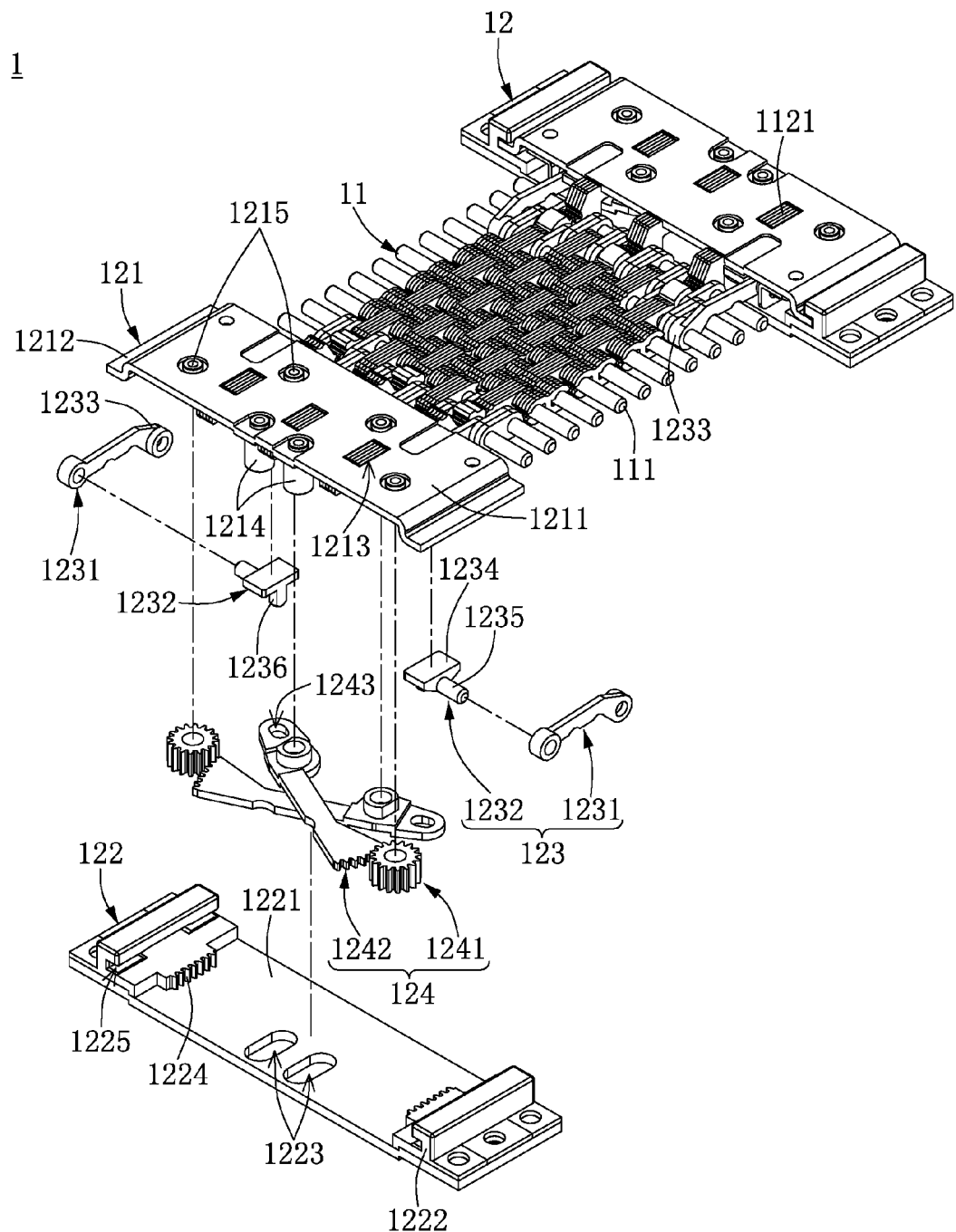
FIG. 6 is an exploded view of FIG. 5.
Figure 7:
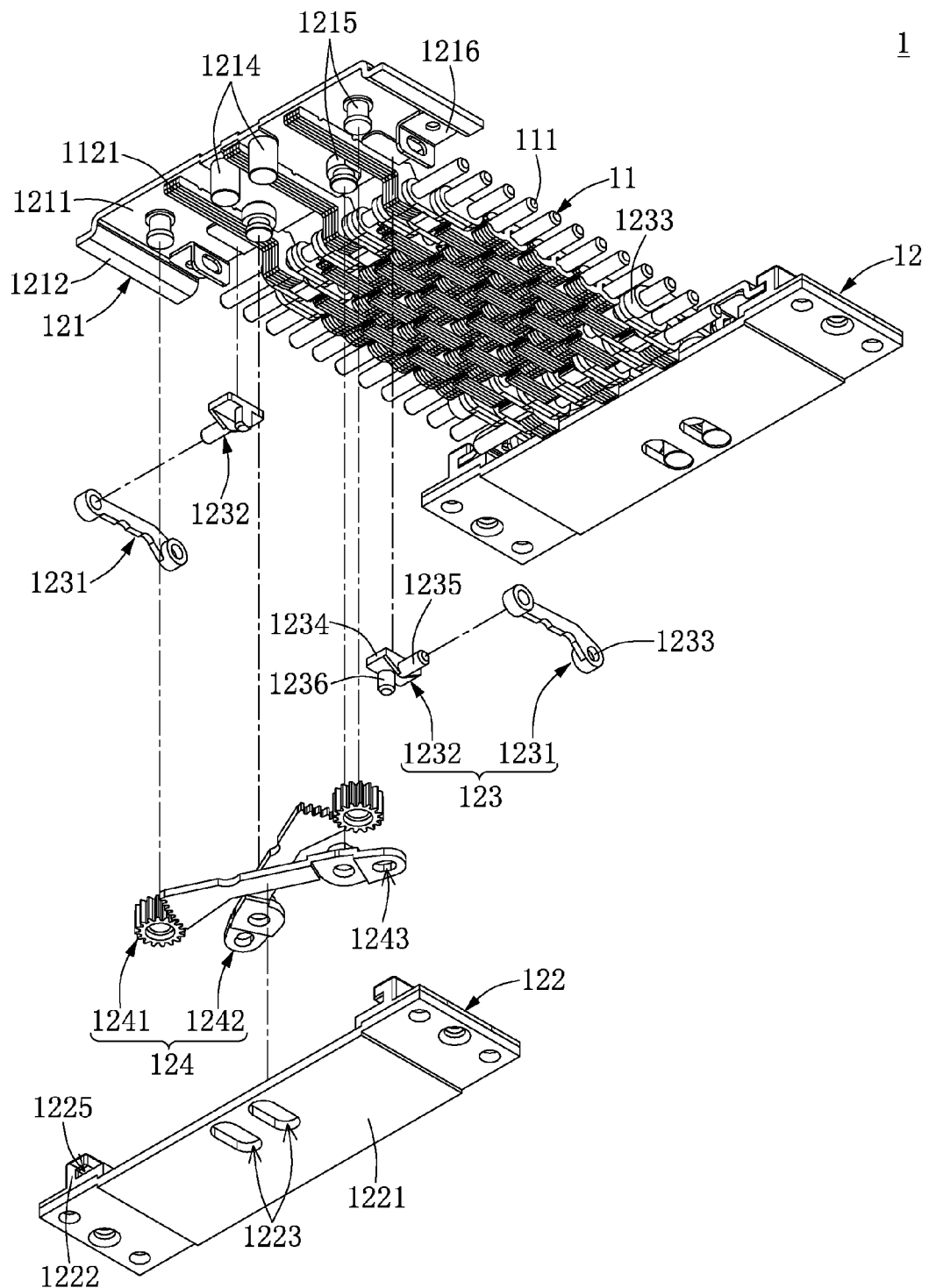
FIG. 7 is an exploded view of FIG. 5 from another perspective.

As shown in FIGS. 6 and 7, the buffering module 12 includes an external linking member 121 fixed on the corresponding positioning portions 1121, an internal linking member 122 movably disposed on the external linking member 121, two driving members 123 installed on the hinge module 11 and movably disposed on the external linking member 121, and two transmitting members 124 movably disposed on the external linking member 121. The cooperation of the driving members 123 and the transmitting members 124 is configured to maintain a predetermined moving path of the internal linking member 122 with respect to the external linking member 121.

Specifically, the external linking member 121 includes a plate 1211, two flanges 1212 curvedly extended from two opposite ends of the plate 1211 toward the carrying plate 4 (or the internal linking member 122), at least one fixing portion 1213 (i.e., opening shown in FIG. 6) formed on the plate 1211, at least one guiding pin 1214 fixed on the plate 1211, a plurality of pivoting portions 1215 fixed on the plate 1211, and two supporting frames 1216 each having an L shape and fixed on the plate 1211. The number of the at least one fixing portion 1213 in the instant embodiment is equal to that of the corresponding positioning portion 1121, and the external linking member 121 is fixed on the hinge module 11 by using the at least one fixing portion 1213 to mount on the corresponding positioning portion 1121.

Figure 4:
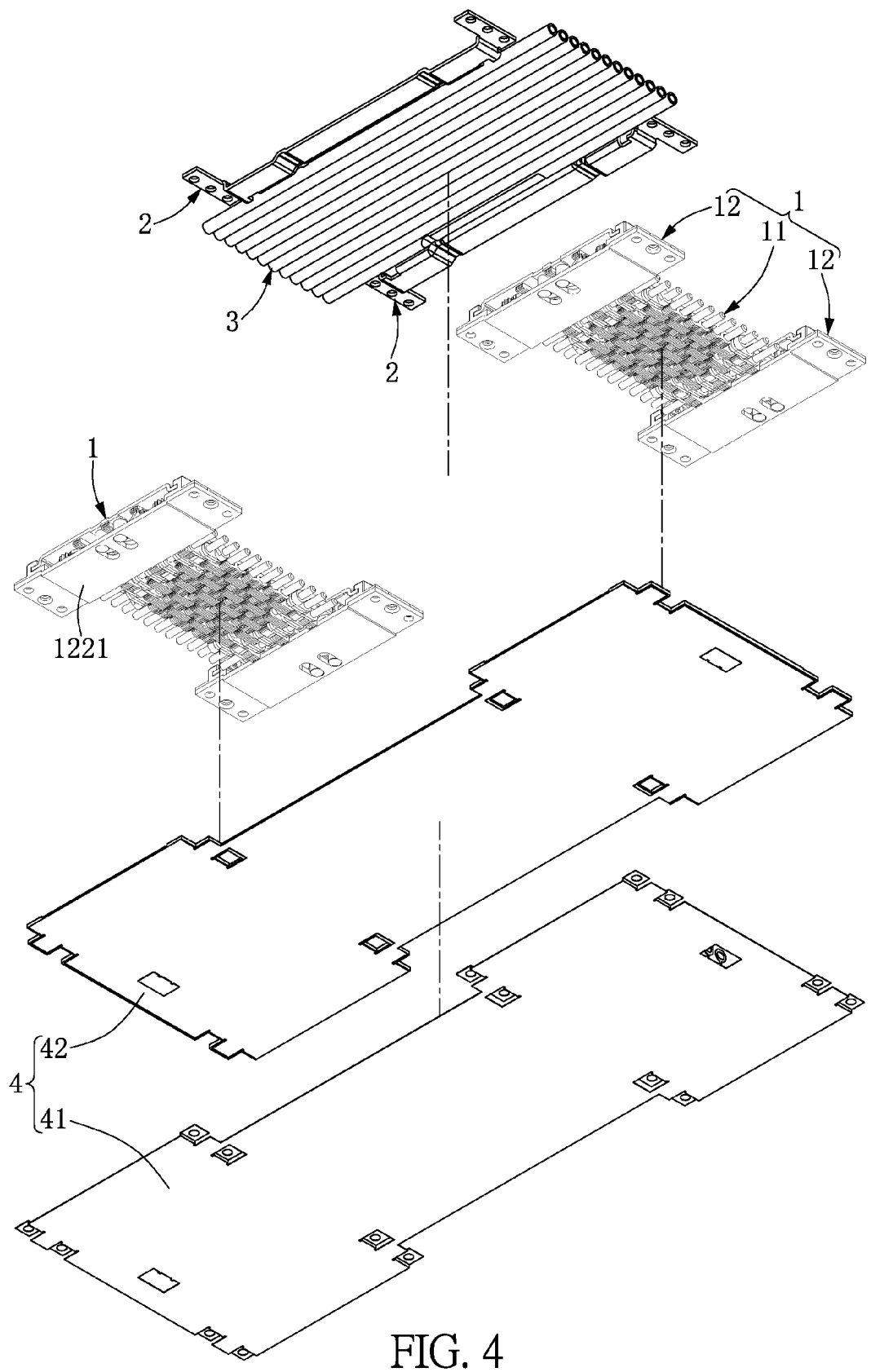
FIG. 4 is an exploded view of FIG. 1A from another perspective as omitting the soft display.

The internal linking member 122 includes a board 1221 and two blocks 1222 respectively installed on two opposite portions of the board 1221. The board 1221 is fixed on the carrying plate 4 (as shown in FIG. 4), and the board 1221 has at least one elongated track 1223. The guiding pin 1214 of the external linking member 121 is inserted into the track 1223, and the guiding pin 1214 and the track 1223 are movable with respect to each other. Each block 1222 has a rack gear 1224 arranged close to the board 1221, and the two rack gears 1224 face to each other. Each block 1222 has a groove 1225 arranged away from the board 1221. The flanges 1212 of the external linking member 121 are respectively inserted into the grooves 1225, and the flanges 1212 and the grooves 1225 are movable with respect to each other.

In addition, the cooperation of the external linking member 121 and the internal linking member 122 in the instant embodiment adapts to the two flanges 1212 and the corresponding grooves 1225, but the instant disclosure is not limited thereto. In a non-shown embodiment, the external linking member 121 can be provided with only one flange 1212, and the internal linking member 122 can be provided with at least one groove 1225 for receiving the flange 1212.

The two driving members 123 are respectively cooperated with the two transmitting members 124, and the two driving members 123 can respectively drive (or move) the two rack gears 1224 through the transmitting members 124. Each driving member 123 has a first end portion 1233 and an opposite second end portion 1236. The first end portions 1233 of the two driving members 123 are respectively sleeved at two opposite portions of one of the pivots 111. The second end portions 1236 of the two driving members 123 are movably with respect to the plate 1211 of the external linking member 121. The two transmitting members 124 are respectively and movably installed to the pivoting portions 1215. Each transmitting member 124 is connected to the corresponding internal linking member 122 and the corresponding second end portion 1236, and the transmitting member 124 is configured to be driven by the second end portion 1236 to move the internal linking member 122.

Moreover, the two driving members 123 and the two transmitting members 124 can be regarded as two assemblies, the two assemblies in the instant embodiment are substantially the identical or symmetrical constructions, so the following description only illustrates one assembly of the driving member 123 and the transmitting member 124. In addition, in a non-shown embodiment, each buffering module 12 can include only one assembly of the driving member 123 and the transmitting member 124.

Specifically, the driving member 123 includes a curved rod 1231 and a slider 1232 pivotally connected to the curved rod 1231. An end portion of the curved rod 1231 is defined as the first end portion 1233, and the other end portion is pivotally connected to the slider 1232. The pivot 111 inserted into the first end portion 1233 is not inserted into the torsion unit 112 having the positioning portion 1121 (as shown in the right part of FIG. 6). In the instant embodiment, at least one pivot 111 (i.e., the second pivot 111 counted from right side as shown in FIG. 6) is disposed between the pivot 111 inserted into the first end portion 1233 (i.e., the third pivot 111 counted from right side as shown in FIG. 6) and the pivot 111 inserted into the torsion unit 112 having the positioning portion 1121 (i.e., the first pivot 111 counted from right side as shown in FIG. 6), but the instant disclosure is not limited thereto.

The slider 1232 includes a main body 1234, a pillar 1235 extended from the main body 1234, and the second end portion 1236 extended from the main body 1234. The main body 1234 is movably disposed on the plate 1211 of the external linking member 121 and is abutted against the corresponding positioning portion 1121. The pillar 1235 passes through the curved rod 1234 and (an elongated hole of) the corresponding supporting frame 1216, and the pillar 1235 is slidable with respect to the supporting frame 1216. The second end portion 1236 having a pillar-like construction is approximately perpendicular to the pillar 1235 and the plate 1211, and the second end portion 1236 passes through the transmitting member 124.

The transmitting member 124 includes a gear 1241 and a connecting rod 1242, and the gear 1241 and the connecting rod 1242 are respectively and pivotally connected to two of the pivoting portions 1215 of the external linking member 121. The gear 1241 in the instant embodiment is a spur gear, and the gear 1241 is engaged with the corresponding rack gear 1224. The connecting rod 1242 having an elongated shape, an end of the connecting rod 1242 having a gearing shape is engaged with the gear 1241, and the other end of the connecting rod 1242 is connected to the second end portion 1236 of the driving member 123. Moreover, the connecting rod 1242 has an elongated hole 1243 sleeved at the second end portion 1236, and the second end portion 1236 is configured to rotate the connecting rod 1242 with respect to the external linking member 121 by pushing an inner wall defining the elongated hole 1243.

Thus, when the hinge module 11 of each supporting device 1 is bent (as shown in FIGS. 1B, 2B, 6, and 7), the curved rod 1231 of the driving member 123 drives the slider 1232 to move on the external linking member 121, and the second end portion 1236 of the slider 1232 rotates the connecting rod 1242 to rotate the gear 1241, so the rack gear 1224 is driven by the gear 1241 to make the internal linking member 122 slide with respect to the external linking member 121.

In other words, when the hinge modules 11 of the two supporting devices 1 of the bendable display apparatus 100 are bent from the unfolded position (as shown in FIGS. 1A and 1B) toward the inwardly folded position (as shown in FIGS. 2A and 2B), for each buffering module 12, the second end portion 1236 of each driving member 123 moves the internal linking member 122 to slide with respect to the external linking member 121 by using the corresponding transmitting member 124, and the internal linking member 122 moves away from the pivots 111. The moving distance of the internal linking member 122 is preferably proportional to the bending angle of the hinge module 11, but the instant embodiment is not limited thereto.

When the supporting device 1 is bent from the inwardly folded position (as shown in FIGS. 2A and 2B) to the unfolded position (as shown in FIGS. 1A and 1B), each guiding pin 1214 is arranged at one of two opposite ends of the corresponding track 1223 (i.e., the outer end of the track 1223 shown in FIG. 1B), and each internal linking member 122 cannot further move away from the inwardly folded position (i.e., the supporting device 1 cannot be outwardly bent) by the cooperation between each guiding pin 1214 and the corresponding track 1223, such that the hinge module 11 can be maintained at the unfolded position. Moreover, when the supporting device 1 is bent from the unfolded position (as shown in FIGS. 1A and 1B) to the inwardly folded position (as shown in FIGS. 2A and 2B), each guiding pin 1214 is arranged at the other end of the corresponding track 1223 (i.e., the inner end of the track 1223 shown in FIG. 2B), and each internal linking member 122 cannot further move away from the unfolded position (i.e., the supporting device 1 cannot be further bent) by the cooperation between each guiding pin 1214 and the corresponding track 1223, such that the hinge module 11 can be maintained at the inwardly folded position.

Figure 3:
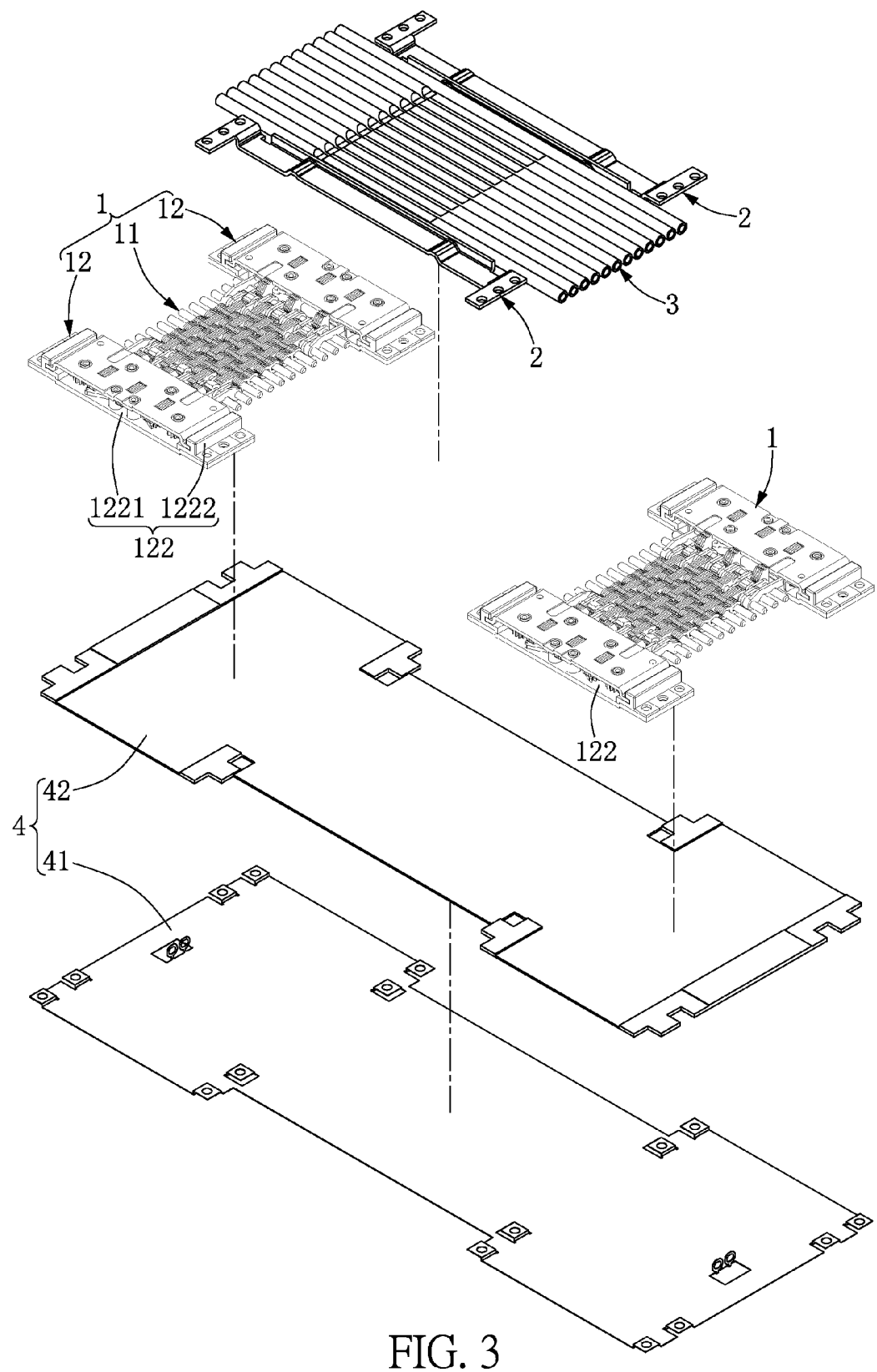
FIG. 3 is an exploded view of FIG. 1A as omitting the soft display.

As shown in FIGS. 3 and 4, each connecting member 2 is an elongated sheet. Two adjacent internal linking members 122 respectively arranged on the two supporting devices 1 (i.e., the upper left internal linking members 122 and the lower left internal linking members 122 as shown in FIG. 3) are connected by one of the two connecting members 2. Ends of the connecting tubes 3 are respectively sleeved at the pivots 111 of one of the two supporting devices 2, and the other ends of the connecting tubes 3 are respectively sleeved at the pivots 111 of the other supporting device 2. Thus, the two supporting devices 1 can be smoothly operated at the same time by using the connecting members 2 and the connecting tubes 3.

As shown in FIGS. 3 and 4, the carrying plate 4 is fixed on (the boards 1221 of) the internal linking members 122 of the two supporting devices 1. The carrying plate 4 includes a metal layer 41 and a cushion layer 42. The metal layer 41 is fixed on (the boards 1221 of) the internal linking members 122 of the two supporting devices 1, and the soft display 5 is mounted on the metal layer 41. The cushion layer 42 is disposed between the metal layer 41 and the two supporting devices 1.

In addition, the soft display 5 in the instant embodiment is fixed on the carrying plate 4, but the instant disclosure is not limited thereto. In a non-shown embodiment, the soft display 5 can be directly fixed on (the boards 1221 of) the internal linking members 122 of the two supporting devices 1.

In summary, when the hinge modules 11 of the bendable display apparatus 100 are bent between the unfolded position and the inwardly folded position, the hinge modules 11 does not compress the soft display 5 (or the carrying plate 4) by moving the internal linking members 122 with respect to the external linking members 121. Thus, when the two supporting devices 1 support the soft display 5, the soft display 5 can be bent without suffering damage.

Moreover, when the bendable display apparatus 100 is at the unfolded position, the construction of each supporting device 1 is provided to block the hinge module 11 to move away from the inwardly folded position, thereby preventing the soft display 5 (or the carrying plate 4) from an outwardly bending.

In addition, when each hinge module 11 is at the inwardly folded position (as shown in FIG. 2A), each of the hinge module 11 has a C-shaped construction, a portion of the soft display 5 corresponding to the hinge modules 11 and the connecting tubes 3 also has a C-shaped construction, and the other portions of the soft display 5 corresponding to the buffering modules 12 and the two connecting members 2 are parallel to each other.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A bendable display apparatus, comprising:
    two supporting devices each including:
        a hinge module including:
            a plurality of pivots parallel to each other and arranged in a row; and
            a plurality of torsion units sleeved at the pivots, wherein two positioning portions are respectively arranged on two opposite portions of the torsion units; and
        two buffering modules respectively arranged at two opposite sides of the row of the pivots and respectively fixed on the two positioning portions, each of the two buffering modules including:
            an external linking member fixed on the corresponding positioning portion;
            an internal linking member movably disposed on the external linking member;
            a driving member having a first end portion and an opposite second end portion, wherein the first end portion is sleeved at one of the pivots, and the second end portion is movable with respect to the external linking member; and
            a transmitting member movably disposed on the external linking member, wherein the transmitting member is configured to be driven by the second end portion to move the internal linking member;
        wherein in each of the two supporting devices, the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction;
        wherein in each of the two supporting devices, when the hinge module is bent from the unfolded position toward the inwardly folded position, the second end portion of the driving member of each of the buffering modules moves the corresponding internal linking member away from the pivots by using the transmitting member;
    a carrying plate fixed on the internal linking members of the two supporting devices; and
    a soft display mounted on the carrying plate.

2. The bendable display apparatus as claimed in claim 1, wherein in each of the buffering modules, the internal linking member includes a rack gear, the transmitting member includes a gear and a connecting rod, the gear is engaged with the rack gear, an end of the connecting rod is engaged with the gear, and the other end of the connecting rod is connected to the second end portion.

3. The bendable display apparatus as claimed in claim 2, wherein in each of the buffering modules, the connecting rod has an elongated hole sleeved at the second end portion, and the second end portion is configured to rotate the connecting rod with respect to the external linking member by pushing an inner wall defining the elongated hole.

4. The bendable display apparatus as claimed in claim 1, wherein in each of the buffering modules, the driving member includes a curved rod having the first end portion and a slider having the second end portion, a portion of the curved rod arranged away from the first end portion is pivotally connected to the slider, and the slider is slidably disposed on the external linking member.

5. The bendable display apparatus as claimed in claim 1, wherein in each of the buffering modules, the internal linking member includes a groove, the external linking member includes a flange inserted into the groove, and the flange and the groove are movable with respect to each other.

6. The bendable display apparatus as claimed in claim 1, wherein in each of the buffering modules, the internal linking member includes a track, the external linking member includes a guiding pin inserted into the track, the guiding pin and the track are movable with respect to each other, wherein when the guiding pin is arranged at one of two opposite ends of the track, the corresponding hinge module is maintained at the unfolded position, and when the guiding pin is arranged at the other end of the track, the corresponding hinge module is maintained at the inwardly folded position.

7. The bendable display apparatus as claimed in claim 1, further comprising at least one connecting member, wherein two adjacent internal linking members respectively arranged on the two supporting devices are connected by the at least one connecting member.

8. The bendable display apparatus as claimed in claim 7, further comprising a plurality of connecting tubes, ends of the connecting tubes are respectively sleeved at the pivots of one of the two supporting devices, and the other ends of the connecting tubes are respectively sleeved at the pivots of the other supporting device.

9. The bendable display apparatus as claimed in claim 1, wherein the carrying plate includes a metal layer and a cushion layer, the metal layer is fixed on the internal linking members of the two supporting devices, the soft display is mounted on the metal layer, and the cushion layer is disposed between the metal layer and the two supporting devices.

10. The bendable display apparatus as claimed in claim 1, wherein in each of the buffering modules, the internal linking member includes a board and at least one block mounted on the board, the at least one block includes a rack gear and a groove, the transmitting member includes a gear and a connecting rod, the gear is engaged with the rack gear, an end of the connecting rod is engaged with the gear, and the other end of the connecting rod is connected to the second end portion, the external linking member includes a flange inserted into the groove, and the flange and the groove are movable with respect to each other.

11. The bendable display apparatus as claimed in claim 10, wherein in each of the buffering modules, the driving member includes a curved rod having the first end portion and a slider, the slider includes a main body, a pillar extended from the main body, and the second end portion extended from the main body, the main body is slidably disposed on the external linking member and is abutted against the corresponding positioning portion, the pillar passes through the curved rod, and the second end portion is approximately perpendicular to the pillar and passes through the connecting rod.

12. The bendable display apparatus as claimed in claim 1, wherein in each of the two supporting devices, the inwardly folded position is defined by inwardly bending the hinge module from the unfolded position at 180 degrees.

13. The bendable display apparatus as claimed in claim 1, wherein in each of the two supporting devices, the external linking member of each of the two buffering modules has at least one opening, and the two positioning portions of the hinge module are respectively inserted into the openings of the external linking members of the two buffering modules.

14. A supporting device, comprising:
a hinge module including:
a plurality of pivots parallel to each other and arranged in a row; and
a plurality of torsion units sleeved at the pivots, wherein two positioning portions are respectively arranged on two opposite portions of the torsion units; and
two buffering modules respectively arranged at two opposite sides of the row of the pivots and respectively fixed on the two positioning portions, each of the two buffering modules including:
an external linking member fixed on the corresponding positioning portion;
an internal linking member movably disposed on the external linking member;
a driving member having a first end portion and an opposite second end portion, wherein the first end portion is sleeved at one of the pivots, and the second end portion is movable with respect to the external linking member; and
a transmitting member movably disposed on the external linking member, wherein the transmitting member is configured to be driven by the second end portion to move the internal linking member;
wherein the hinge module is bendable between an unfolded position and an inwardly folded position along at least one of the pivots, and the torsion units are configured to stop the hinge module at a desired position between the unfolded position and the inwardly folded position; when the hinge module is at the unfolded position, the supporting device is a flat construction; when the hinge module is at the inwardly folded position, the supporting device is a curved construction and the internal linking members are approximately arranged at the inner side of the curved construction;
wherein when the hinge module is bent from the unfolded position toward the inwardly folded position, the second end portion of the driving member of each of the buffering modules moves the corresponding internal linking member away from the pivots by using the transmitting member.

15. The supporting device as claimed in claim 14, wherein in each of the buffering modules, the internal linking member includes a rack gear, the transmitting member includes a gear and a connecting rod, the gear is engaged with the rack gear, an end of the connecting rod is engaged with the gear, and the other end of the connecting rod is connected to the second end portion.

16. The supporting device as claimed in claim 15, wherein in each of the buffering modules, the connecting rod has an elongated hole sleeved at the second end portion, and the second end portion is configured to rotate the connecting rod with respect to the external linking member by pushing an inner wall defining the elongated hole.

17. The supporting device as claimed in claim 14, wherein in each of the buffering modules, the internal linking member includes a board and at least one block mounted on the board, the at least one block includes a rack gear and a groove, the transmitting member includes a gear and a connecting rod, the gear is engaged with the rack gear, an end of the connecting rod is engaged with the gear, and the other end of the connecting rod is connected to the second end portion, the external linking member includes a flange inserted into the groove, and the flange and the groove are movable with respect to each other.

18. The supporting device as claimed in claim 17, wherein in each of the buffering modules, the driving member includes a curved rod having the first end portion and a slider, the slider includes a main body, a pillar extended from the main body, and the second end portion extended from the main body, the main body is slidably disposed on the external linking member and is abutted against the corresponding positioning portion, the pillar passes through the curved rod, the second end portion is approximately perpendicular to the pillar and passes through the connecting rod.

19. The supporting device as claimed in claim 14, wherein the inwardly folded position is defined by inwardly bending the hinge module from the unfolded position at 180 degrees.

20. The supporting device as claimed in claim 14, wherein the external linking member of each of the two buffering modules has at least one opening, and the two positioning portions of the hinge module are respectively inserted into the openings of the external linking members of the two buffering modules.

\* \* \* \* \*